(12) United States Patent
Caulfield et al.

(10) Patent No.: US 7,787,489 B2
(45) Date of Patent: Aug. 31, 2010

(54) MOBILE DATA DISTRIBUTION

(75) Inventors: Michael Caulfield, San Francisco, CA (US); Sarge Kennedy, Alamo, CA (US)

(73) Assignee: Oracle International Corporation, Redwood Shores, CA (US)

(*) Notice: Subject to any disclaimer, the term of this patent is extended or adjusted under 35 U.S.C. 154(b) by 1968 days.

(21) Appl. No.: 10/266,824

(22) Filed: Oct. 7, 2002

(65) Prior Publication Data
US 2007/0177571 A1   Aug. 2, 2007

(51) Int. Cl.
*H04L 12/66* (2006.01)
(52) U.S. Cl. .................. 370/463; 455/414.2; 455/432.3
(58) Field of Classification Search ................ 709/248, 709/219, 224; 707/203, 10, 1, 2, 201, 102, 707/100; 715/740; 717/171; 370/350, 352, 370/463; 455/403.411, 414.2, 432.3
See application file for complete search history.

(56) References Cited

U.S. PATENT DOCUMENTS

| | | | |
|---|---|---|---|
| 5,499,371 A | 3/1996 | Henninger et al. | 717/708 |
| 5,694,598 A | 12/1997 | Durand et al. | 707/103 R |
| 5,710,922 A | 1/1998 | Alley et al. | 707/201 |
| 5,729,735 A | 3/1998 | Meyering | 707/10 |
| 5,758,337 A | 5/1998 | Hammond | 707/6 |
| 5,862,325 A | 1/1999 | Reed et al. | |
| 5,905,988 A * | 5/1999 | Schwartz et al. | 707/104.1 |
| 5,937,409 A | 8/1999 | Wetherbee | 707/1 |
| 6,039,624 A * | 3/2000 | Holmes | 455/403 |
| 6,240,422 B1 | 5/2001 | Atkins et al. | 707/102 |
| 6,272,545 B1 | 8/2001 | Flanagin et al. | |
| 6,317,754 B1 | 11/2001 | Peng | 707/203 |
| 6,324,544 B1 | 11/2001 | Alam et al. | 707/201 |
| 6,393,434 B1 | 5/2002 | Huang et al. | |
| 6,442,570 B1 | 8/2002 | Wu | |
| 6,505,200 B1 | 1/2003 | Ims et al. | |
| 6,539,381 B1 | 3/2003 | Prasad et al. | 707/10 |

(Continued)

FOREIGN PATENT DOCUMENTS

WO   WO 9805176 A2 * 2/1998

(Continued)

OTHER PUBLICATIONS

The Personal Server: Changing the Way We Think about Ubiquitous Computing Tuesday, Want et al. Intel Research, 2200 Mission College Blvd, Santa Clara, CA, 95054 Jan. 1, 2002.*

(Continued)

*Primary Examiner*—Salman Ahmed
(74) *Attorney, Agent, or Firm*—Townsend and Townsend and Crew LLP (57) ABSTRACT

Selectively replicating data from a network server to a mobile device during a synchronization is provided. The system and method of the invention associates mobile device users with roles that include rules. Each of the rules includes one or more conditions that can be either static or dynamic. When a rule is invoked, only those specific instances of data that satisfy the conditions of the rule are replicated to the mobile device. Whether a rule of a role is invoked can be made to depend on a device type of the mobile device. The method can also exclude data from replication where the user lacks an authorization to access a particular data type, even though a valid rule would otherwise permit the data to be synchronized.

15 Claims, 5 Drawing Sheets

U.S. PATENT DOCUMENTS

| | | | |
|---|---|---|---|
| 6,608,556 B2* | 8/2003 | De Moerloose et al. | 340/501 |
| 6,611,537 B1* | 8/2003 | Edens et al. | 370/503 |
| 6,633,924 B1 | 10/2003 | Wu et al. | 719/328 |
| 6,636,897 B1* | 10/2003 | Sherman et al. | 709/248 |
| 6,674,445 B1* | 1/2004 | Chithambaram et al. | 345/619 |
| 6,707,811 B2 | 3/2004 | Greenberg et al. | |
| 6,751,657 B1* | 6/2004 | Zothner | 709/220 |
| 6,823,373 B1* | 11/2004 | Pancha et al. | 709/219 |
| 6,862,617 B1 | 3/2005 | Wu | 709/224 |
| 6,910,052 B2 | 6/2005 | Gates et al. | |
| 6,928,467 B2 | 8/2005 | Peng | |
| 6,968,209 B1 | 11/2005 | Ahlgren et al. | |
| 6,990,523 B2 | 1/2006 | Wu | |
| 7,039,656 B1 | 5/2006 | Tsai et al. | |
| 7,047,259 B1 | 5/2006 | Chasman et al. | |
| 7,076,567 B1* | 7/2006 | Chasman et al. | 709/248 |
| 7,127,477 B2 | 10/2006 | Duncombe et al. | |
| 7,127,679 B2 | 10/2006 | Cohen | |
| 7,143,092 B1 | 11/2006 | Gregorat | |
| 7,149,761 B2 | 12/2006 | Cooke et al. | |
| 7,149,813 B2 | 12/2006 | Flanagin et al. | |
| 7,185,364 B2 | 2/2007 | Knouse et al. | |
| 7,209,949 B2 | 4/2007 | Mousseau et al. | |
| 7,213,039 B2 | 5/2007 | Ramanujam | |
| 7,275,243 B2* | 9/2007 | Gibbons et al. | 717/159 |
| 7,310,653 B2 | 12/2007 | Coyle et al. | |
| 7,363,022 B2* | 4/2008 | Whelan et al. | 455/411 |
| 7,383,302 B2* | 6/2008 | Cohen et al. | 709/205 |
| 7,451,163 B2 | 11/2008 | Selman et al. | |
| 2001/0038624 A1 | 11/2001 | Greenberg et al. | 370/352 |
| 2002/0033843 A1 | 3/2002 | Loos et al. | 715/740 |
| 2002/0050927 A1* | 5/2002 | De Moerloose et al. | 340/539 |
| 2002/0057803 A1 | 5/2002 | Loos et al. | 380/270 |
| 2002/0123898 A1* | 9/2002 | Lemay et al. | 705/1 |
| 2002/0133507 A1 | 9/2002 | Holenstein et al. | |
| 2002/0184535 A1* | 12/2002 | Moaven et al. | 713/202 |
| 2003/0004983 A1 | 1/2003 | Cohen | 715/500 |
| 2003/0074580 A1* | 4/2003 | Knouse et al. | 713/201 |
| 2003/0130984 A1 | 7/2003 | Quinlan et al. | |
| 2003/0159136 A1 | 8/2003 | Huang et al. | 717/171 |
| 2003/0220980 A1* | 11/2003 | Crane | 709/207 |
| 2004/0034853 A1* | 2/2004 | Gibbons et al. | 717/174 |
| 2004/0198319 A1* | 10/2004 | Whelan et al. | 455/411 |
| 2004/0215793 A1* | 10/2004 | Ryan et al. | 709/229 |
| 2004/0225731 A1* | 11/2004 | Piispanen et al. | 709/224 |
| 2005/0125459 A1* | 6/2005 | Sutinen et al. | 707/201 |
| 2005/0131716 A1* | 6/2005 | Hanan et al. | 705/1 |
| 2005/0180464 A1* | 8/2005 | McConnell et al. | 370/494 |
| 2005/0283445 A1* | 12/2005 | Trinon et al. | 705/75 |
| 2006/0015487 A1* | 1/2006 | Vest | 707/3 |
| 2006/0031237 A1* | 2/2006 | DeAnna et al. | 707/100 |
| 2006/0117073 A1* | 6/2006 | Bosworth et al. | 707/201 |
| 2006/0248232 A1* | 11/2006 | Chasman et al. | 709/248 |
| 2007/0016695 A1 | 1/2007 | Rabbers et al. | |
| 2007/0099703 A1* | 5/2007 | Terebilo | 463/42 |
| 2007/0100735 A1* | 5/2007 | Kemp et al. | 705/37 |
| 2007/0177571 A1* | 8/2007 | Caulfield et al. | 370/350 |
| 2007/0180075 A1 | 8/2007 | Chasman et al. | |
| 2007/0220065 A1 | 9/2007 | Coyle et al. | |
| 2007/0244981 A1* | 10/2007 | Malden et al. | 709/217 |
| 2007/0250426 A1* | 10/2007 | Demirjian | 705/36 R |
| 2008/0288874 A1* | 11/2008 | Hoyle | 715/738 |
| 2008/0313262 A1* | 12/2008 | Cho et al. | 709/201 |
| 2009/0019367 A1* | 1/2009 | Cavagnari et al. | 715/716 |
| 2009/0063381 A1* | 3/2009 | Chan et al. | 706/47 |
| 2009/0112837 A1* | 4/2009 | Modani et al. | 707/5 |
| 2009/0187440 A1* | 7/2009 | Sreevas et al. | 705/7 |
| 2010/0005346 A1* | 1/2010 | Hamlescher et al. | 714/57 |

OTHER PUBLICATIONS

Data Synchronization in Mobile and Distributed Networks by Sachin Kumar Agarwal B.Tech., Regional Engineering College, Warangal, India May 2000.*

Configurable and networked web-based vertical applications Ni, D.C.; Ni, S.; Computer Networks and Mobile Computing, 2001. Proceedings. 2001 International Conference on Digital Object Identifier: 10.1109/ICCNMC.2001.962572 Publication Year: 2001 , pp. 41-46.*

Engineering mobile agent applications via context-dependent coordination Cabri, G.; Leonardi, L.; Zambonelli, F.; Software Engineering, IEEE Transactions on vol. 28 , Issue: 11 Digital Object Identifier: 10.1109/TSE.2002.1049403 Publication Year: 2002 , pp. 1039-1055.*

U.S. Appl. No. 10/133,124, Chasman et al.
U.S. Appl. No. 10/133,164, Chasman.
U.S. Appl. No. 10/183,144, Heinke.

* cited by examiner

MOBILE DATA DISTRIBUTION

BACKGROUND OF THE INVENTION

1. Field of the Invention

The present invention relates generally to the field of data distribution, and more particularly to a system and method for synchronizing data to mobile devices.

2. Description of the Prior Art

In networked computer systems data is commonly stored in a central location such as a collection of disk drives connected to a network server. In networked computer systems such as those commonly found in business offices, a network server includes a primary data storage system for the network, and the networked computers access files and other data from the network server to cache locally. Increasingly, mobile devices such as laptop computers, handheld computers, and Personal Digital Assistants (PDAs) are being linked to networked computer systems. Typically, a mobile device is only connected to a network server for a short periods of time. During these times it is usually desirable to synchronize data between the network server and the mobile device.

Perhaps the simplest implementation of a method for synchronizing data between a network server and a mobile device is to replicate to the mobile device all of the data stored on the network server. While this method is simple to implement, it is generally impractical. A significant problem is that most network servers store a quantity of data that exceeds the storage capacity of the mobile device. Accordingly, any practical method for synchronizing data between a network server and a mobile device must limit the quantity of data that will be synchronized.

Ideally, a method for synchronizing data between a network server and a mobile device will limit the quantity of synchronized data to only that which is necessary for the operation of the mobile device. Limiting the quantity of synchronized data serves at least two important goals. First, it lessens the length of time necessary to perform a synchronization. Second, it allows the mobile device to devote less memory capacity to data storage, which makes more capacity available to be used by software applications. Since insufficient free memory will typically cause applications on a mobile device to execute slowly, limiting the quantity of synchronized data will tend to improve the operation of software applications running on the mobile device.

Accordingly, what is needed is an efficient way to identify an appropriate subset of the data on a network server during a synchronization.

SUMMARY

The present invention provides a method for selectively replicating data from a network server to a mobile device during a synchronization. The method associates roles to mobile device users, where a role contains a collection of rules for data distribution. All users assigned the same role will receive data during a synchronization according to the rules specified by that role. A user having more than one role will receive data during a synchronization according to each of the roles.

Each role includes at least one rule, but not every rule of the role is necessarily followed during a synchronization. In some embodiments rules can be enabled or disabled depending on a device type of the receiving mobile device. Enabling rules for some device types but not for others can be advantageous to tailor the quantity of replicated data to the memory capacity of the mobile device. Fewer rules can be enabled for mobile devices with more restricted memory capacities.

In some embodiments rules can also be excluded where a user lacks the proper authorization. For example, a permission list can be used to indicate whether the user is authorized to access certain types of data. If the user is not authorized to access a type of data, any rule that selects data of that data type will also be excluded from the synchronization, even though a role associated with the user may allow the rule. In some embodiments, each rule is associated with a data type by a component interface. In these embodiments the permission list can indicate user authorizations according to each component interface.

Each rule includes at least one condition. When a rule is applied to data, only the data that satisfies the conditions of the rule is replicated to the mobile device. Conditions can be either static or dynamic. A static condition stays the same while a dynamic condition will depend on some factor, such as the identity of the user or the device type of the mobile device. Dynamic conditions allow, for example, two users with the same type of mobile device and the same user authorizations to synchronize different data by applying the same rules. In this way a synchronization can be tailored to an individual, the mobile device the individual is using, and the individual's particular circumstances.

DETAILED DESCRIPTION OF THE INVENTION

The present invention provides a method for selectively replicating data to a mobile device during a synchronization. The method employs a set of data distribution rules that are associated with a user of the mobile device. Each of the rules includes one or more conditions. Only the specific instances of data that satisfy the conditions are transferred to the mobile device. The data distribution rules can be made dependent on a device type of the mobile device so that, for example, data that would be replicated to a laptop computer would not be replicated to a PDA. Further, the invention can exclude an entire set of data from replication where the user lacks the authorization to access the set, even though the rules would otherwise permit the data to be synchronized.

Figure 1:
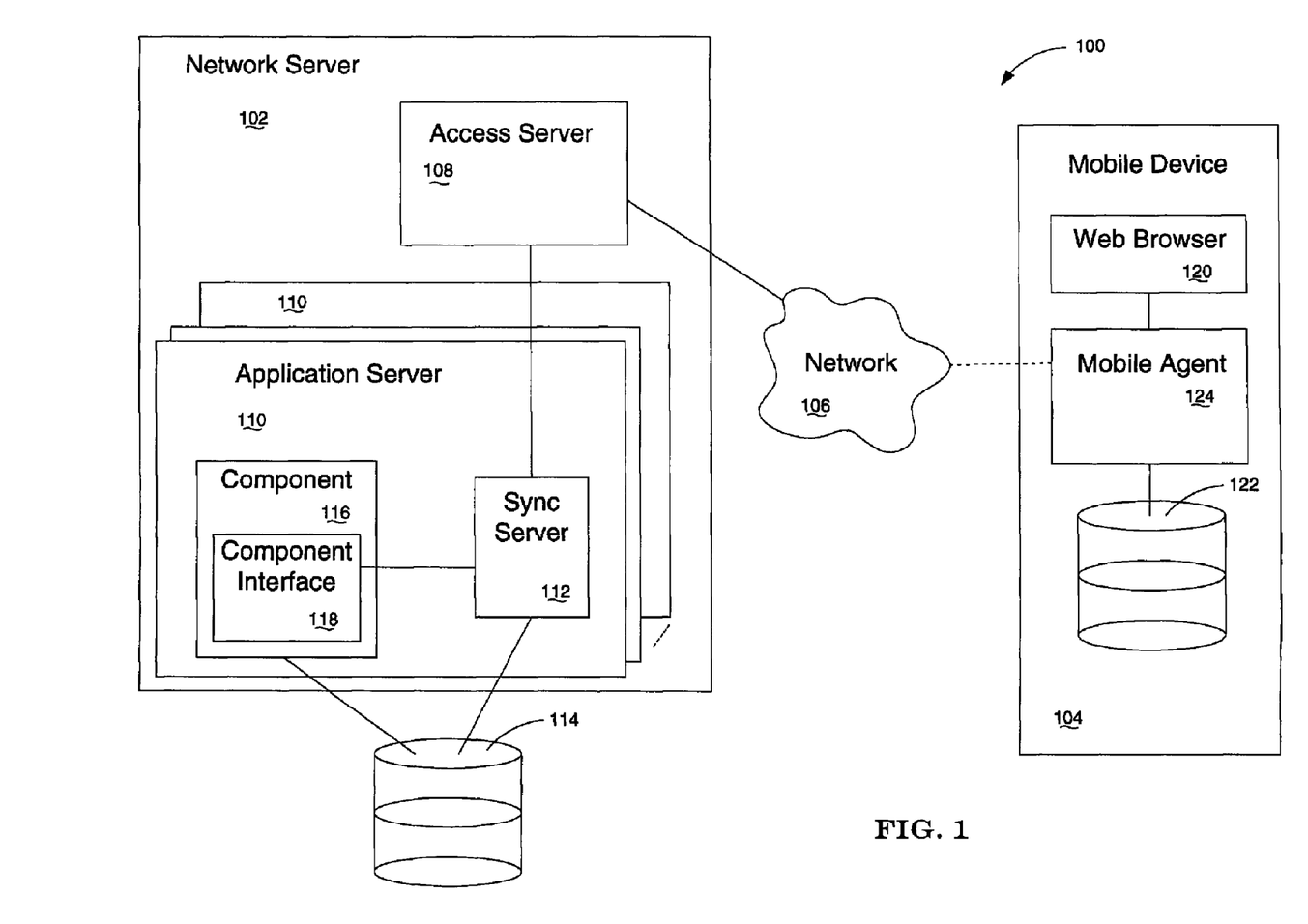
FIG. 1 is a schematic diagram of a system including a network server in communication with a mobile device across a network.

To better set forth the invention, aspects of the supporting hardware will first be described in greater detail. FIG. 1 illustrates a system 100 including a network server 102 that can communicate with a mobile device 104 across a network 106. Network 106 may be, for example, a public switch telephone network (PSTN), a Local Area Network (LAN), a Wide Area Network (WAN), a public network such as the Internet, a broadband network, a wireless network, or a combination of any of these. In FIG. 1 a solid line is used to represent the communications link between the network server 102 and the network 106 to indicate that the link is continuously maintained. A dashed line is used to represent the communications link between the mobile device 104 and the network 106 to indicate that the link may be temporary.

The network server 102 includes an access server 108, that in some embodiments is a web server. The access server 108 maintains the connection to the network 106 and can also communicate with one or more application servers 110. More specifically, access server 108 includes a sync gateway servlet (not shown) that is configured to communicate with a sync server 112 of each application server 110 and to specify an address, such as a URL, to the network 106 so that the access server 108 can be located and accessed by the mobile device 104.

Each application server 110 may be a separate server, or may be a partition of a larger server such as an enterprise server, or may be distributed across several servers. Each application server 110 stores data in a component store 114, that may be, for example, a dedicated storage device within the application server 110, a storage device shared by several application servers 110, a network attached storage device (NAS), a storage area network (SAN) connected to the application server 110, or a database maintained on any of these devices.

Data is stored in the component store 114 as components 116, where a component 116 is a collection of records and application processing logic. Each component 116 is of a particular component type, for example, any component 116 that represents a particular set of records about a customer (e.g., name, location, type of business, and number of employees) is a component 116 of the "customer" component type. Each component is associated according to its component type with one or more component interfaces 118.

A component interface 118 serves several functions. One function is to expose components 116 to the access server 108 during a synchronization. In this capacity the component interface 118 specifies which records are replicated to the mobile device 104. For example, the component interface 118 can be configured such that if the mobile device 104 is a PDA fewer records of the component 116 are replicated, whereas if the mobile device 104 is a laptop computer all records are replicated. Another function of the component interface 118 is to aggregate rules that can be applied to components 116 of the associated component type. The use of rules to select components 116 from the component store 114 will be described in more detail below with respect to FIG. 2.

Mobile device 104 may be any type of remote electronic device, for example, a personal computer, a laptop computer, or a handheld device such as a personal digital assistant (PDA), a mobile telephone, or a text messaging device. Mobile device 104 includes software, such as web browser 120, for displaying information to the user of the mobile device 104 and to provide a user interface. Information displayed to the user can include data stored as objects in object store 122. A mobile agent 124 facilitates the synchronization of the objects in object store 122 with the data stored in component store 114. The interaction of the mobile agent 124 and the sync server 112 during a synchronization are described in more detail in U.S. patent application Ser. No. 10/133,124 "Simplified Application Object Data Synchronization for Optimized Data Storage," (issued Jul. 11, 2006 as U.S. Pat. No. 7,076,567) and U.S. patent application Ser. No. 10/133,164 "System and Method for Synchronization of Version Annotated Objects," (Notice of Allowance mailed Jun. 12, 2009),both applications filed on Apr. 25, 2002, and both incorporated by reference herein. It should be noted that the term "component" is used to refer to data in the component store 114 while the term "object" is used to refer to data in the object store 122 to denote that components are typically stored in a relational format while objects are typically stored in an object-like format. The invention, however, is independent of the format of the respective stores 114 and 122.

Figure 2:
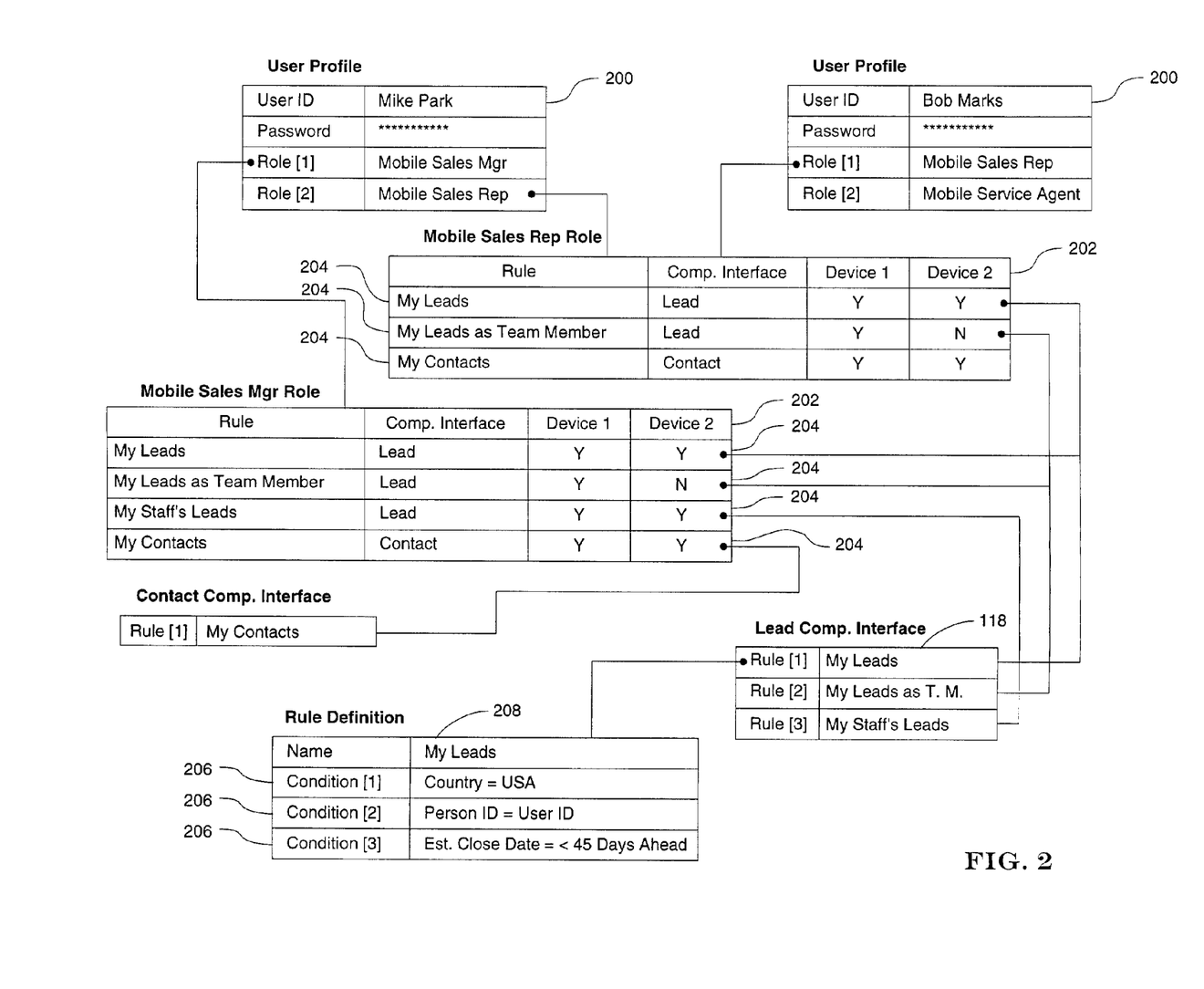
FIG. 2 is a chart depicting meta-data relationships between a user profile, a role, a rule, and a condition according to an embodiment of the invention.

FIG. 2 is a chart depicting meta-data relationships of the invention. The network server 102 stores in the component store 114 a user profile 200 for each user. Each user profile 200 includes information specific to the user, such as a password. Additionally, each user profile 200 can include roles 202 that define which component types the user will have access to during a synchronization. In some embodiments a user can be excluded from including any roles 202, but in most instances each user will include one or more roles 202, as shown in FIG. 2 for two different user profiles 200. As also shown, more than one user can be associated with the same role 202.

Each role 202 typically includes one or more rules 204, though the invention can be implemented so that a role 202 includes no rules 204. Each rule 204 associates together a component interface 118 with one or more conditions 206. The conditions 206 can be grouped together, for example, with a rule definition 208. During a synchronization, each condition 206 places a restriction on which components 116 of the particular component type associated with the component interface 118 can be replicated to the mobile device 104. For example, for the rule 204 "My Leads," the component interface 118 is "Lead" and one of the conditions 206 is "Country=USA." Here, the "Lead" component interface 118 is associated with components 116 of the "lead" component type. Components 116 of the "lead" component type each include a field for "Country." During a synchronization, the condition 206 "Country=USA" limits the components 116 that may be replicated to the mobile device 104 to only those for which the "Country" field is USA. When a rule 204 is invoked that includes more than one condition 206, only those components 116 with fields that satisfy all of the conditions 206 may be replicated to the mobile device 104.

In some embodiments each rule 204 can be selectively invoked depending on the device type of the mobile device 104. For example, a rule 204 may be invoked when the device type is a PDA, while not invoked if the device type is a mobile phone. This allows, for example, the ability to tailor the amount of data that is replicated to a mobile device 104 according to its memory capacity. In some embodiments, a rule definition 208 can be associated with a flag for each recognized device type for mobile device 104, and in some embodiments the association is made by a role 202. The flag, shown in FIG. 2 as "Y" or "N," indicates whether the device type is authorized to receive data according to the rule 204. A rule 204 can be associated in this way with any number of device types.

A condition 206 can be either static or dynamic. A static condition 206 is one that does not change. A dynamic condition depends on some factor, such as the identity of the user, the device type of the mobile device, the day of the week that the synchronization is requested, and so forth. For example, in FIG. 2 the condition "Country=USA" is static because it will limit the components 116 of the component type "lead" to those for which the "Country" field is "USA" regardless of the identity of the user, for instance. On the other hand, the condition "User ID=% User ID" is a dynamic condition because it specifies that the only components 116 that are eligible to be replicated are those for which the field "User ID" matches the specific User ID of the user of the mobile device 104. Here, the factor that the dynamic condition "User ID=% User ID" depends upon is the identity of the user. The use of dynamic conditions 206 in rules 204 allows the data that is replicated to a mobile device 104 to be appropriate to an individual user, the user's specific mobile device type, and the user's circumstances.

Figure 3:
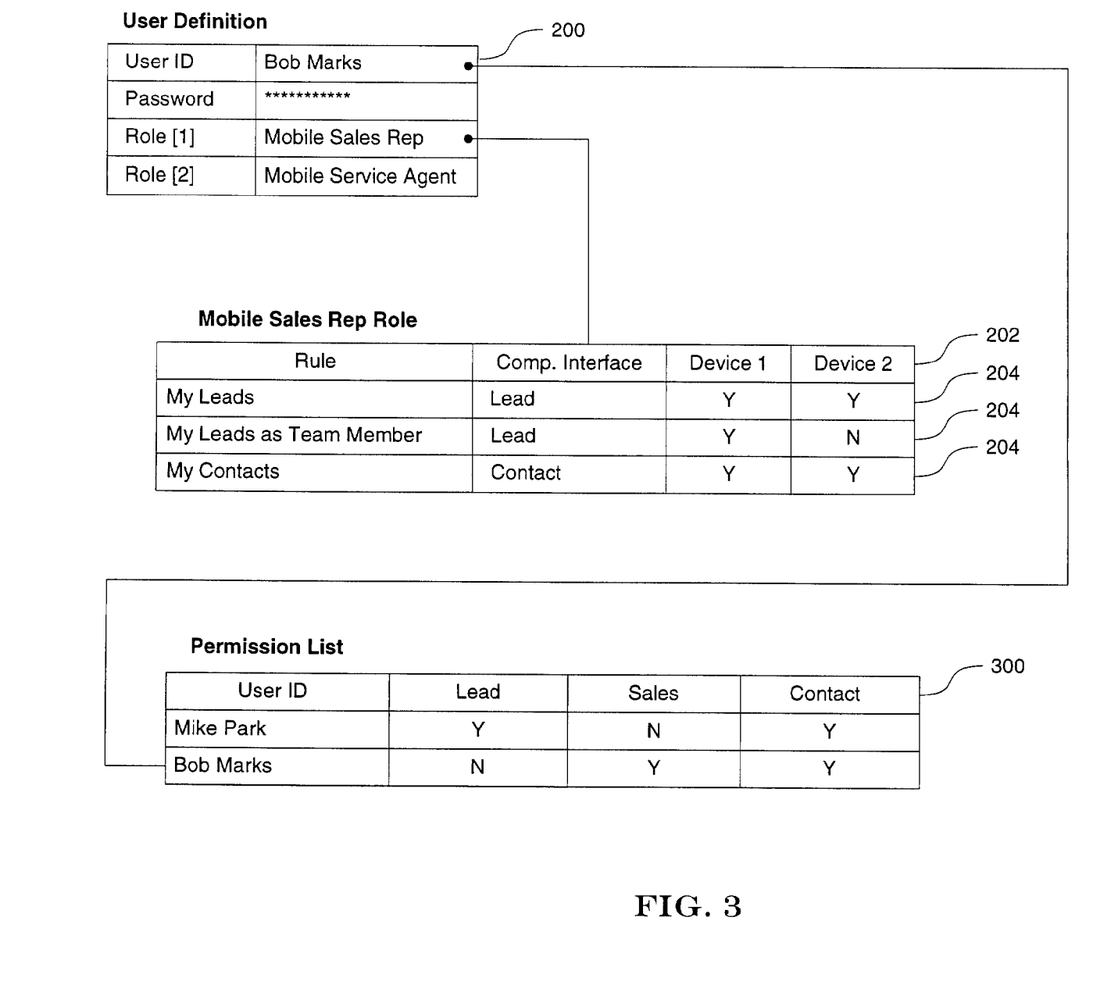
FIG. 3 is a chart depicting further meta-data relationships between a user profile, a role, and a permission list according to an embodiment of the invention.

FIG. 3 is a chart depicting additional meta-data relationships of the invention that provide a user authorization feature that can be included with the meta-data relationships shown in FIG. 2. The authorization feature associates a user's identity with an authorization to access the various component types. As shown in FIG. 3, in some embodiments a permission list 300 associates a User ID for a user with authorizations to access component types. In the example in FIG. 3, a flag that can be set to either "Y" or "N" is used to indicate whether the user is authorized to receive components 116 of the component type associated with the particular component interface 118. In the example of FIG. 3, the User Profile 200 for Bob Marks includes the Mobile Sales Rep role 202 and is therefore allowed components 116 associated with the "lead" component interface 118 that satisfy both of the rules 204 "My Leads" and "My Leads as Team Member." However, since permission list 300 does not give Bob Marks authorization to access the component interface 118 for "Lead," Bob Marks will not be able to synchronize components 116 according to the rules 204 "My Leads" and "My Leads as Team Member."

Figure 4:
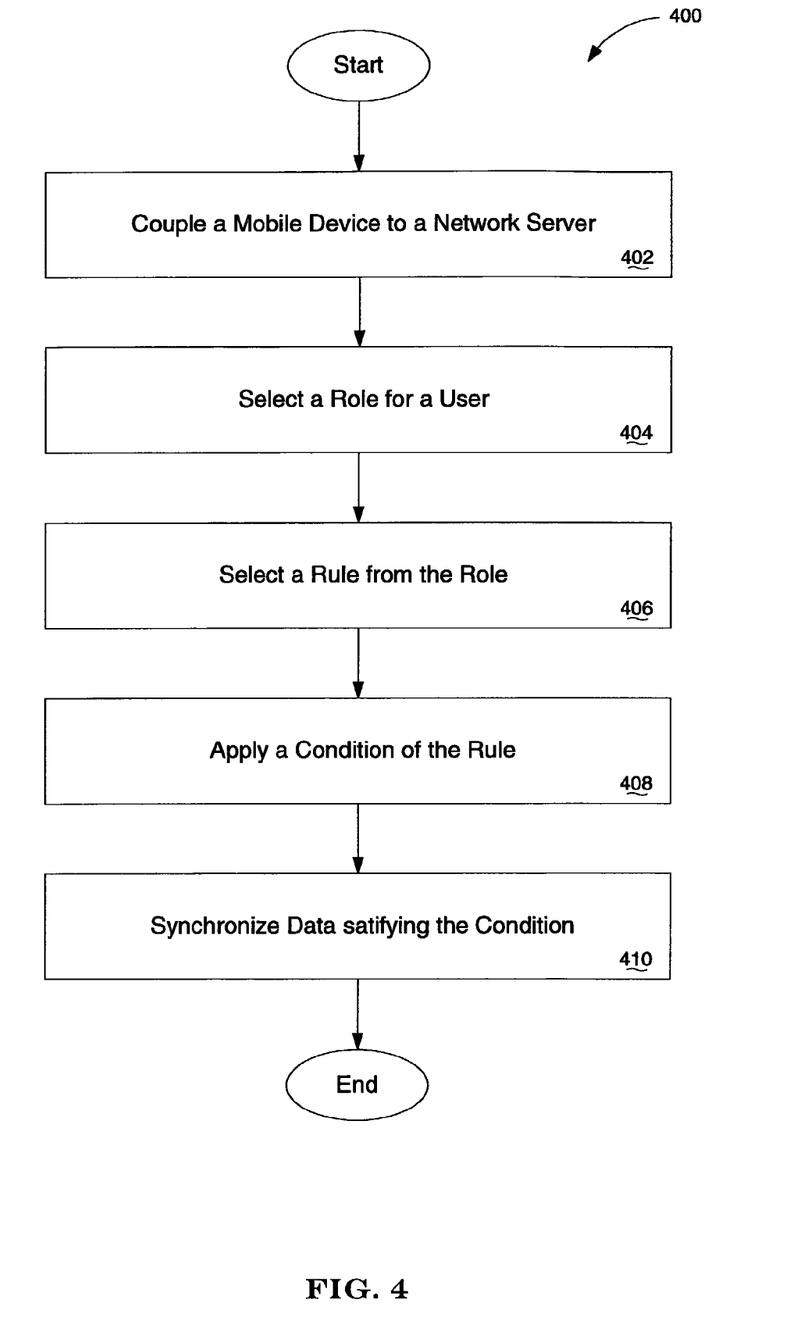
FIG. 4 is a flow chart of a method of the invention according to one embodiment thereof.

FIG. 4 shows a flow chart 400 of the method of the invention. In some embodiments the steps of flow chart 400 are performed by a sync server 112. In a first step 402 a mobile device 104 is coupled to a network server 102. This step can be performed, for example, by establishing a temporary connection through a network 106 such as the Internet. The necessary duration of this temporary connection can be minimized by limiting the number of components 116 that are replicated during a synchronization according to the method of the invention. Step 402 can include transmitting identifying indicia from the mobile device 104 to the network server 102. The identifying indicia can include a User ID and a password to gain access to the access server 108, for example. The identifying indicia can also include the device type of the mobile device 104. Step 402 can also include establishing a connection between the access server 108 and a particular application server 110. Establishing a connection between the access server 108 and a particular application server 110 can also include establishing a connection to a sync server 112 of the application server 110.

Once the mobile device 104 is coupled to the network server 102, step 404 provides for selecting a role 202 for the user. A user's User ID can be associated with one or more roles 202, for example, by a user profile 200. According to the method of the invention, a first role 202 is selected and any associated rules 204 are executed. After all of the associated rules 204 have been executed, any additional roles 202 are handled in the same manner. In some embodiments a role 202 is selected by a simple schema such as by the order of listing in the user profile 200, or by a more sophisticated method such as by the order of the number of associated rules 204.

Once a role 202 has been selected, in step 406 a rule 204 is selected from that role 202. The same schema for selecting a role 202 can also be applied to selecting a rule 204. In some embodiments step 406 includes identifying a device type of the mobile device 104. In some of these embodiments step 406 further includes determining that the device type is authorized to receive data according to the rule 204. For example, meta-data, such as role 202, can associate the device type with the rule 204. In the example shown in FIG. 2, a flag indicates whether the device type is authorized with either a "Y" or a "N." Accordingly, in step 406 a rule 204 that is not authorized for the particular mobile device 104 can be excluded from the synchronization. It may be desirable to exclude a rule 204 during a synchronization to further limit the amount of data that is replicated where the mobile device 104 has a limited storage capacity.

Step 406 can also include determining whether a user is authorized to receive data associated with the particular component interface 118 that is identified to the rule 204. A table, such as permission list 300 in FIG. 3, can be used to associate the authorization for the component interface 118 with the user. In those embodiments that include a permission list 300, a rule 204 is only executed in step 406 if the user is authorized to receive data associated with the particular component interface 118. Thus, in step 406 a rule 204 of a role 202 associated with a user may be excluded because the user lacks the authorization to receive data associated with the component interface 118 for the rule 204.

In some embodiments a user can manually select rules 204 during step 406. In some of these embodiments the user is able to access a screen through the web browser 120 on the mobile device 104 that allows the user to change the authorizations for rules 204 that are associated with different device types. In this way a user, working through the mobile device 104, can reconfigure at each synchronization which rules 204 are invoked for each of the user's roles 202. It will be appreciated that although the manual selection of rules 204 has been described within the context of step 406, this process can also be performed at any time before or after a synchronization. For example, the manual selection of rules 204 can be performed after the mobile device 104 is coupled to the network server 102 in step 402 but before a role 202 is selected in step 404. Alternatively, the user can manually select rules 204 after the synchronization is complete so that the new selections are followed the next time a synchronization is performed.

In step 408 a condition 206 associated with the rule 204 is applied to identify a component 116. In some embodiments this is accomplished by examining each component 116 associated with the component interface 118 to identify those components 116 that satisfy the condition 206. Where more than one condition 206 is associated with a rule 204, the components 116 identified by applying the first condition 206 can be further filtered by the subsequent conditions 206 until only those components 116 that satisfy all of the conditions 206 remain. For each component 116 that satisfies the conditions 206 of a rule 204, a unique identifier, such as a sync ID, can be written to a synchronization list.

Figure 5:
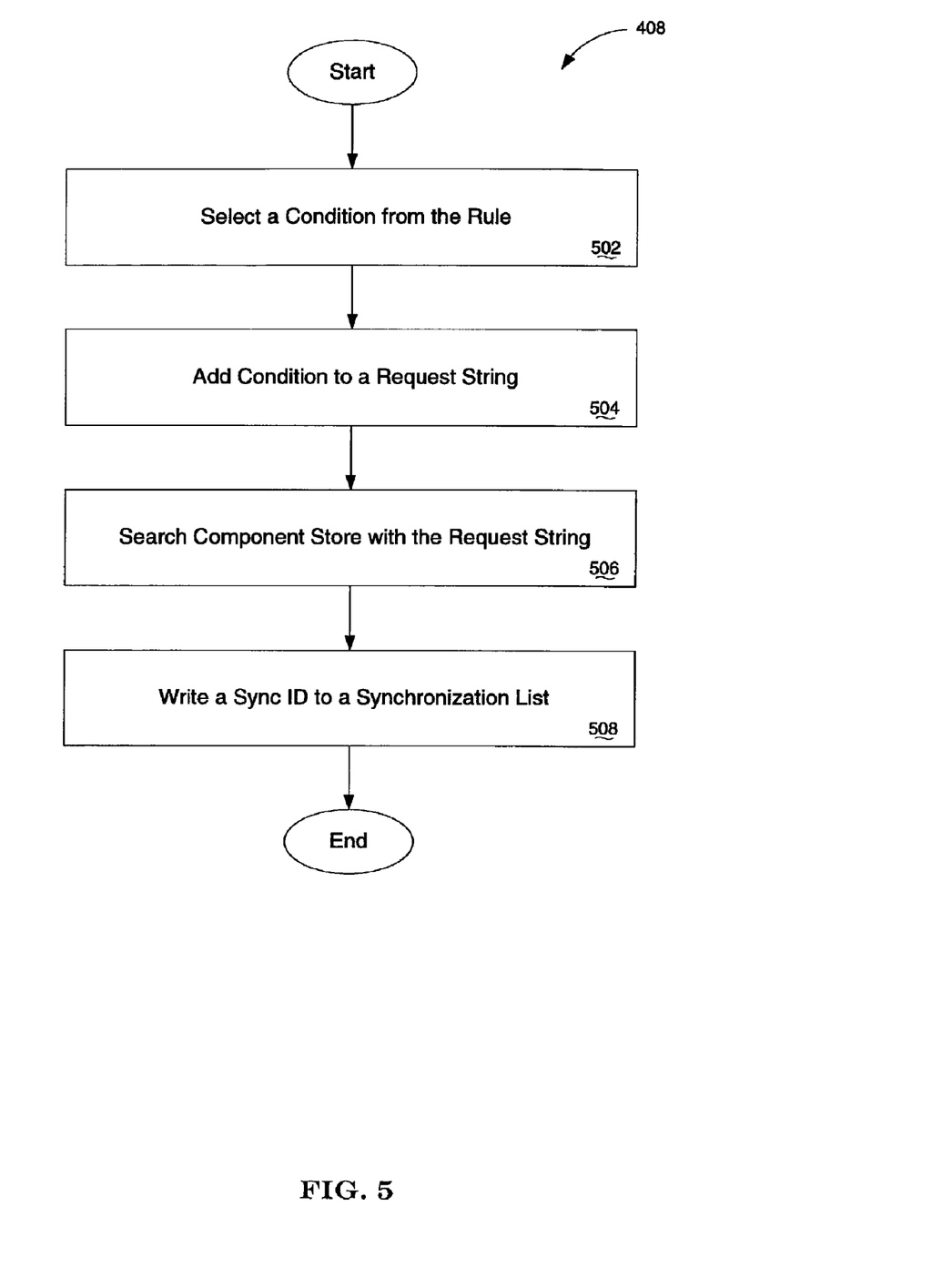
FIG. 5 is a flow chart of a method of applying a condition according to one embodiment of the invention.

FIG. 5 is a flow-chart that illustrates how step 408 is performed in some embodiments. In these embodiments a condition 206 is selected from a rule 204 in a step 502. In a step 504, the condition is written to a request string, for example, through the use of Standard Query Language (SQL). In a step 506 a component store 114 is searched with the request string to identify only those components 116 that satisfy the condition 206. In a step 508, a unique identifier, such as a Sync ID, is written to a synchronization list for each identified component 116. Where more than one condition 206 is associated with the rule 204, each condition 206 can be added to the request string in step 504. In this way, only those components 116 that satisfy the conditions 206 that were written to the request string will be identified in step 506. As components 116 are identified, a sync ID for each is written to a synchronization list in step 508.

In some further embodiments steps 502 and 504 are repeated until all of the conditions 206 associated with all of the rules 204 associated with all of the roles 202 involved in the synchronization have been added to the request string. Then, in step 506 the component store 114 is searched only once by the request string that includes all of the conditions 206 to produce a complete synchronization list. In some of these embodiments, the user can view a summary of the synchronization list that can show, for example, how many components 116 of each component type were identified. In further embodiments the user can change an authorization between a rule 204 and the device type of the mobile device 104 and have the system derive a new synchronization list and display a new summary. By this iterative process a user can customize a synchronization before data is replicated.

Returning to FIG. 4, in step 410 data satisfying the condition 206 is synchronized to the mobile device 104. In those embodiments in which sync IDs are written to a synchronization list, in step 410 the components 116 corresponding to the sync IDs on the synchronization list are sequentially replicated to the mobile device 104. In some embodiments step 410 includes using the component interface 118 associated with the component 116 to define an object to be sent to the mobile device 104. Step 410 can also include serializing the data to flatten any hierarchical data structure and to format the flattened data for communication across the network 106. Formatting the flattened data can include, for example, the use of a mark-up language such as Hyper-Text Markup Language (HTML) or Extensible Markup Language (XML).

The invention also includes a computer-readable medium comprising program instructions for synchronizing data from a network server 102 to a mobile device 104. The computer-readable medium can be, for example, a floppy diskette or a CD-ROM. The program instructions contained on the computer-readable medium include computer code for performing the method of the invention described above. By installing the program instructions on a suitable network server 102, the network server 102 can be enabled to synchronize data to a mobile device 104 according to the method of the invention.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. For example, the methods described herein can also be used to synchronize data from a network server to a non-mobile device such as a network computer or another network server. The specification and drawings are, accordingly, to be regarded as illustrative rather than restrictive.

What is claimed is:

1. A method of synchronizing data from a network server to a mobile device, the method comprising:
   receiving, at one or more computer systems, information indicating that the mobile device is coupled to the network server;
   accessing, with one or more processors associated with the one or more computer systems, a user profile that associates a user of the mobile device to at least one role containing a collection of rules for data distribution and identifying which component types the user will have access to during a synchronization;
   selecting, with the one or more processors associated with the one or more computer systems, a role from the at least one role associated with the user, the selected role including at least one rule for data distribution, a component interface being associated with the at least one rule and exposing one or more components of an associated type during a synchronization;
   selecting, with the one or more processors associated with the one or more computer systems, a rule for data distribution from the at least one rule for data distribution included by the selected role based on a storage capacity of the mobile device, the selected rule for data distribution being associated with at least one condition;
   searching, with the one or more processors associated with the one or more computer systems, a set of stored components to identify a plurality of components that satisfy each of the at least one condition, including searching only components associated with the component interface of the selected rule; and
   synchronizing, using the one or more computer systems, the identified plurality of components between the network server and the mobile device.

2. The method of claim 1 wherein searching includes creating a request string that includes each condition of each rule of each role associated with the user profile.

3. The method of claim 1 wherein the component interface comprises a plurality of rules that apply to components of a component type.

4. The method of claim 1 wherein the selected role is selected from the group consisting of a sales manager, a sales representative, and a service agent.

5. A method of synchronizing data from a network server to a mobile device, comprising:
   accessing, with one or more processors associated with one or more computer systems, a user profile that associates a user of the mobile device to at least one role containing a collection of rules for data distribution and identifying which types of records the user will have access to during a synchronization, each role associated with the user profile including at least one rule for data distribution based on a storage capacity of the mobile device, each rule associated with a role including at least one condition;
   creating, with the one or more processors associated with one or more computer systems, a request string that includes each condition of each rule of each role associated with the user profile;
   searching, with the one or more processors associated with one or more computer systems, a collection of stored records and application processing logic based on the request string to identify at least one record;
   updating, with the one or more processors associated with one or more computer systems, a synchronization list with a unique identifier for each at least one record, the unique identifier being a sync ID;
   creating, with the one or more processors associated with one or more computer systems, information configured for providing a summary of the synchronization list to the user; and
   synchronizing, the one or more computer systems, the at least one record and application processing logic between the network server and the mobile device.

6. The method of claim 5 further comprising allowing the user to change an authorization between a rule of the at least one rule and a device type of the mobile device.

7. The method of claim 6 wherein the user is allowed to change an authorization after the set of components is searched.

8. The method of claim 7 wherein the steps of creating the request string and searching the set of components are repeated after the user is allowed to change the authorization.

9. The method of claim 5 wherein synchronizing the at least one component to the mobile device includes selecting a unique identifier from the synchronization list for a component of the at least one component.

10. A computer program product embedded in a non-transitory tangible computer readable medium for synchronizing data from a network server to a mobile device, the computer program product comprising:

program code for receiving information indicating that the mobile device is coupled to the network server;

program code for accessing a user profile that associates a user of the mobile device to at least one role containing a collection of rules for data distribution and identifying which component types the user will have access to during a synchronization;

program code for selecting a role from the at least one role associated with the user, the selected role including at least one rule for data distribution, a component interface being associated with the at least one rule and exposing one or more components of an associated type during a synchronization;

program code for selecting a rule for data distribution from the at least one rule for data distribution included by the selected role based on a storage capacity of the mobile device, the selected rule for data distribution being associated with at least one condition;

program code for searching a set of stored components to identify a plurality of components that satisfy each of the at least one condition, including searching only components associated with the component interface of the selected rule; and program code for synchronizing the identified plurality of components between the network server and the mobile device.

11. A computer program product embedded in a non-transitory tangible computer readable medium for synchronizing data from a network server to a mobile device, the computer program product comprising:

program code for accessing a user profile that associates a user of the mobile device to at least one role containing a collection of rules for data distribution and identifying which types of records the user will have access to during a synchronization, each role associated with the user profile including at least one rule for data distribution based on a storage capacity of the mobile device, each rule associated with a role including at least one condition;

program code for creating a request string that includes each condition of each rule of each role associated with the user profile;

program code for searching a collection of stored records and application processing logic based on the request string to identify at least one record and writing to a synchronization list a unique identifier for each at least one record;

program code for updating a synchronization list with a unique identifier for each at least one record, the unique identifier being a sync ID;

program code for providing a summary of the synchronization list to the user; and program code for synchronizing the at least one record and application processing logic between the network server and the mobile device.

12. The computer program product of claim 11 further comprising program code for allowing the user to change an authorization between a rule of the at least one rule and a device type of the mobile device.

13. The computer program product of claim 11 further comprising program code for allowing the user to change an authorization after the set of components is searched.

14. The computer program product of claim 11 further comprising program code for repeating the steps of creating the request string and searching the set of components after the user is allowed to change the authorization.

15. The computer program product of claim 11 wherein the program code for synchronizing the at least one component to the mobile device includes program code for selecting a unique identifier from the synchronization list for a component of the at least one component.

* * * * *